(12) United States Patent
Kitazono

(10) Patent No.: US 10,482,657 B2
(45) Date of Patent: Nov. 19, 2019

(54) INFORMATION PROCESSING SYSTEM, NON-TRANSITORY STORAGE MEDIUM HAVING STORED INFORMATION PROCESSING PROGRAM, INFORMATION PROCESSING DEVICE, INFORMATION PROCESSING METHOD, GAME SYSTEM, NON-TRANSITORY STORAGE MEDIUM HAVING STORED GAME PROGRAM, GAME DEVICE, AND GAME METHOD

(71) Applicant: NINTENDO CO., LTD., Kyoto (JP)

(72) Inventor: Yusuke Kitazono, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 189 days.

(21) Appl. No.: 15/724,562

(22) Filed: Oct. 4, 2017

(65) Prior Publication Data

US 2018/0197334 A1    Jul. 12, 2018

(30) Foreign Application Priority Data

Jan. 6, 2017    (JP) .................................. 2017-001394

(51) Int. Cl.
| | |
|---|---|
| *A63F 13/5258* | (2014.01) |
| *G06T 19/00* | (2011.01) |
| *A63F 13/56* | (2014.01) |
| *A63F 13/25* | (2014.01) |
| *A63F 13/40* | (2014.01) |

(52) U.S. Cl.
CPC ............ *G06T 19/003* (2013.01); *A63F 13/25* (2014.09); *A63F 13/40* (2014.09); *A63F 13/5258* (2014.09); *A63F 13/56* (2014.09); *G06T 2210/21* (2013.01)

(58) Field of Classification Search
CPC .................................................. A63F 13/5258
See application file for complete search history.

(56) References Cited

U.S. PATENT DOCUMENTS

| | | | | |
|---|---|---|---|---|
| 8,576,235 B1* | 11/2013 | Sumner | ................... | G06T 13/20 |
| | | | | 345/473 |
| 2011/0133383 A1* | 5/2011 | Dyack | .................... | A63F 13/10 |
| | | | | 715/850 |

(Continued)

FOREIGN PATENT DOCUMENTS

JP    2014-235596    12/2014

*Primary Examiner* — Omkar A Deodhar
*Assistant Examiner* — Ross A Williams
(74) *Attorney, Agent, or Firm* — Nixon & Vanderhye, P.C.

(57) ABSTRACT

An information processing system includes: a camera destination calculating unit configured to calculate a position of a destination of a virtual camera in a virtual space, based on predetermined information processing; a camera moving unit configured to move the virtual camera to an avoidance position at which a shielding object is avoided, in a case where a first vector heading from a position of an object to be captured by the virtual camera to the position of the destination, intersects with the shielding object from an outside in the virtual space and a second vector heading from the position of the destination to the position of the object to be captured by the virtual camera, does not intersect with the shielding object from the outside; and an image generating unit configured to generate an image of the virtual space, based on the virtual camera moved by the camera moving unit.

28 Claims, 11 Drawing Sheets

(56) References Cited

U.S. PATENT DOCUMENTS

2011/0206124 A1* 8/2011 Morphet ............... H04N 5/145
  375/240.16
2013/0109473 A1* 5/2013 Yamashita .......... A63F 13/2145
  463/31

* cited by examiner

INFORMATION PROCESSING SYSTEM, NON-TRANSITORY STORAGE MEDIUM HAVING STORED INFORMATION PROCESSING PROGRAM, INFORMATION PROCESSING DEVICE, INFORMATION PROCESSING METHOD, GAME SYSTEM, NON-TRANSITORY STORAGE MEDIUM HAVING STORED GAME PROGRAM, GAME DEVICE, AND GAME METHOD

CROSS REFERENCE TO RELATED APPLICATION

This nonprovisional application is based on Japanese Patent Application No. 2017-001394 filed with the Japan Patent Office on Jan. 6, 2017, the entire contents of which are hereby incorporated by reference.

FIELD

The present disclosure relates to an information processing system that generates an image with a virtual camera set in a virtual space, a non-transitory storage medium having stored an information processing program, an information processing device, an information processing method, a game system, a non-transitory storage medium having stored a game program, a game device, and a game method.

BACKGROUND AND SUMMARY

Conventionally, an information processing system has been known that generates and provides an image (a virtual shot image) to be acquired by shooting with a virtual camera set in a virtual space. Examples of the information processing system include a game system that develops a game in a virtual space and a virtual reality (VR) system that provides VR.

The information processing system moves the virtual camera in the virtual space in accordance with movement of a predetermined object to be captured (e.g., a player character object for a game), to shoot the object to be captured so that an image including the object to be captured is generated. In a case where a different object (a shielding object) is present between the object to be captured and the virtual camera as a result of the virtual camera that has moved in accordance with the movement of the object to be captured, the information processing system performs control of moving the virtual camera to an avoidance position at which no shielding of the shielding object occurs, for example, a position between the object to be captured and the shielding object (shielding avoidance control).

However, according to the shielding avoidance control described above, the virtual camera may suddenly move to the avoidance position so that the image to be generated also varies suddenly.

An object of the present disclosure is to achieve a natural variation in an image with a virtual camera moving in a virtual space. Another object of the present disclosure is to reduce a processing load in shielding avoidance control.

An information processing system according to one aspect includes: a camera destination calculating unit configured to calculate a position of a destination of a virtual camera in a virtual space, based on predetermined information processing; a camera moving unit configured to move the virtual camera to an avoidance position at which a shielding object is avoided, in a case where a first vector heading from a position of an object to be captured by the virtual camera to the position of the destination, intersects with the shielding object from an outside in the virtual space and a second vector heading from the position of the destination to the position of the object to be captured by the virtual camera, does not intersect with the shielding object from the outside; and an image generating unit configured to generate an image of the virtual space, based on the virtual camera moved by the camera moving unit.

The case where the first vector heading from the position of the object to be captured to the position of the destination of the virtual camera, intersects with the shielding object from the outside and the second vector heading from the position of the destination of the virtual camera to the position of the object to be captured, does not intersect with the shielding object from the outside, namely means that the position of the destination of the virtual camera is inside the shielding object. In this manner, the virtual camera moves the avoidance position instead of the position of the destination that has been calculated, in the case where the position of the destination of the virtual camera that has been calculated is inside the shielding object. Thus, a natural variation in the image with the virtual camera can be achieved in comparison to a case where the virtual camera constantly moves to the avoidance position when the shielding object shields the object to be captured when viewed from the virtual camera. Determining whether the first vector heading from the position of the object to be captured to the position of the destination of the virtual camera and the second vector heading from the position of the destination of the virtual camera to the position of the object to be captured, each intersect the shielding object from the outside, determines whether the position of the destination of the virtual camera is inside the shielding object. Thus, the processing load of shielding avoidance control can be reduced in comparison to a case where it is directly determined whether the position of the destination of the virtual camera is inside the shielding object.

The camera moving unit may move the virtual camera to the position of the destination in a case where the first vector does not intersect with the shielding object from the outside.

The case where the first vector does not intersect with the shielding object from the outside means that no shielding object is present between the object to be captured and the destination of the virtual camera and the shielding object does not shield the object to be captured when viewed from the virtual camera. In this case, the virtual camera moves to the destination that has been calculated. With this configuration, in a case where the shielding object does not shield the object to be captured, the virtual camera can move to the position of the destination calculated based on the predetermined information processing.

The camera moving unit may move the virtual camera to the position of the destination in a case where the first vector intersects with the shielding object from the outside and the second vector intersects with the shielding object from the outside.

The case where the first vector intersects with the shielding object from the outside and the second vector also intersects with the shielding object from the outside, means that the shielding object is present between the object to be captured and the virtual camera but the virtual camera is outside the shielding object. With this configuration, in such a case, the virtual camera may move to the position of the destination calculated based on the predetermined information processing, without the shielding avoidance control.

The avoidance position may be at a position on a side of the object to be captured from the shielding object.

With this configuration, the shielding object does not shield the virtual camera at the avoidance position, and thus the image including the object to be captured not shielded can be generated.

The camera destination calculating unit may calculate the position of the destination, based on the predetermined information processing based on an operation of a player.

With this configuration, the position of the destination of the virtual camera can be calculated based on the operation of the player.

The camera destination calculating unit may perform the information processing to move the virtual camera in accordance with movement of the object to be captured that moves in the virtual space based on the operation of the player, and may calculate the position of the destination.

With this configuration, the virtual camera moves in accordance with the movement of the object to be captured that moves based on the operation of the player. Thus, an image of the object to be captured can be acquired, with the player not directly paying attention to an instruction for moving the virtual camera.

The camera destination calculating unit may perform the information processing to move the virtual camera in accordance with an instruction of the player for moving the virtual camera, and may calculate the position of the destination.

With this configuration, the player can directly issue the instruction for moving the virtual camera.

The image generating unit may generate the image indicating the position of the object to be captured in the virtual space, the object to be captured being shielded by the shielding object.

With this configuration, even in a case where the shielding object shields the object to be captured, the position of the object to be captured in the virtual space can be grasped in the image.

The image generating unit may generate the image indicating the object to be captured with a silhouette, the object to be captured being shielded by the shielding object.

With this configuration, the image to be captured is displayed with the silhouette on a screen even in a case where the shielding object shields the object to be captured. Thus, the state of the object to be captured can be grasped.

The information processing system may further include: a first determining unit configured to perform first determination of whether the first vector intersects with the shielding object from the outside; and a second determining unit configured to perform second determination of whether the second vector intersects with the shielding object from the outside. The camera moving unit may move the virtual camera based on a result of the first determination and a result of the second determination.

With this configuration, the first determination and the second determination can be performed as the respective determination processing.

The second determining unit may perform the second determination in a case where the first determining unit determines that the first vector intersects with the shielding object from the outside.

With this configuration, the processing load can be reduced with the second determination not performed in a case where the second determination is unnecessary.

A game system according to one aspect includes: a player character control unit configured to move a player character object in a virtual space based on an operation of a player; a camera destination calculating unit configured to calculate a position of a destination of a virtual camera in the virtual space, in accordance with the movement of the player character object; a shielding determining unit configured to determine whether a shielding object is present between the position of the destination and the player character object; a collision determining unit configured to determine whether the position of the destination is inside the shielding object; a camera moving unit configured to move the virtual camera to a position on a side of the player character object from the shielding object when the shielding determining unit determines that the shielding object is present and the collision determining unit determines that the destination is inside the shielding object; and an image generating unit configured to generate an image of the virtual space to display the image indicating, on the shielding object, that the player character object is present, the player character object being shielded by the shielding object, when the shielding determining unit determines that the shielding object is present and the collision determining unit determines that the position of the destination is outside the shielding object.

With this configuration, avoidance control is performed in a case where the virtual camera moves to the inside of the shielding object, and no avoidance control is performed in a case where the virtual camera is outside the shielding object but the shielding object is present between the virtual camera and the player character object to shield the player character object. Thus, a sudden variation in the image can be avoided. In addition, the image indicating, on the shielding object, that the player character object is present, can be displayed. Thus, it can be confirmed whether the player character object is present, without the avoidance control.

A non-transitory storage medium according to one aspect has stored an information processing program for causing an information processing device to execute: camera destination calculating processing of calculating a position of a destination of a virtual camera in a virtual space, based on predetermined information processing; camera moving processing of moving the virtual camera to an avoidance position at which a shielding object is avoided, in a case where a first vector heading from a position of an object to be captured by the virtual camera to the position of the destination, intersects with the shielding object from an outside in the virtual space and a second vector heading from the position of the destination to the position of the object to be captured by the virtual camera, does not intersect with the shielding object from the outside; and image generating processing of generating an image of the virtual space, based on the virtual camera moved by the camera moving processing.

With this configuration, the virtual camera moves the avoidance position instead of the position of the destination that has been calculated, in the case where the position of the destination of the virtual camera that has been calculated is inside the shielding object. Thus, a natural variation in the image with the virtual camera can be achieved in comparison to a case where the virtual camera constantly moves to the avoidance position when the shielding object shields the object to be captured when viewed from the virtual camera. Determining whether the first vector heading from the position of the object to be captured to the position of the destination of the virtual camera and the second vector heading from the position of the destination of the virtual camera to the position of the object to be captured, each intersect the shielding object from the outside, determines whether the position of the destination of the virtual camera is inside the shielding object. Thus, the processing load of shielding avoidance control can be reduced in comparison to a case where it is directly determined whether the position of the destination of the virtual camera is inside the shielding object.

The camera moving processing may move the virtual camera to the position of the destination in a case where the first vector does not intersect with the shielding object from the outside.

With this configuration, in a case where the shielding object does not shield the object to be captured, the virtual camera can move to the position of the destination calculated based on the predetermined information processing.

The camera moving processing may move the virtual camera to the position of the destination in a case where the first vector intersects with the shielding object from the outside and the second vector intersects with the shielding object from the outside.

With this configuration, the virtual camera can move to the position of the destination calculated based on the predetermined information processing, without the shielding avoidance control, in a case where the shielding object is present between the object to be captured and the virtual camera but the virtual camera is outside the shielding object.

The avoidance position may be at a position on a side of the object to be captured from the shielding object.

With this configuration, the shielding object does not shield the virtual camera at the avoidance position, and thus the image including the object to be captured not shielded can be generated.

The camera destination calculating processing may calculate the position of the destination, based on the predetermined information processing based on an operation of a player.

With this configuration, the position of the destination of the virtual camera can be calculated based on the operation of the player.

The camera destination calculating processing may perform the information processing to move the virtual camera together with movement of a player character object that moves in the virtual space based on the operation of the player, and may calculate the position of the destination.

With this configuration, the virtual camera moves in accordance with the movement of the object to be captured that moves based on the operation of the player. Thus, an image of the object to be captured can be acquired, with the player not directly paying attention to an instruction for moving the virtual camera.

The camera destination calculating processing may perform the information processing to move the virtual camera in accordance with an instruction of the player for moving the virtual camera, and may calculate the position of the destination.

With this configuration, the player can directly issue the instruction for moving the virtual camera.

The image generating processing may generate the image indicating the position of the object to be captured in the virtual space, the object to be captured being shielded by the shielding object.

With this configuration, even in a case where the shielding object shields the object to be captured, the position of the object to be captured in the virtual space can be grasped in the image.

The image generating processing may generate the image indicating the object to be captured with a silhouette, the object to be captured being shielded by the shielding object.

With this configuration, the image to be captured is displayed with the silhouette on a screen even in a case where the shielding object shields the object to be captured. Thus, the state of the object to be captured can be grasped.

The non-transitory storage medium may have stored the information processing program for causing the information processing device to further execute: first determining processing of performing first determination of whether the first vector intersects with the shielding object from the outside; and second determining processing of performing second determination of whether the second vector intersects with the shielding object from the outside. The camera moving processing may move the virtual camera based on a result of the first determination and a result of the second determination.

With this configuration, the first determination and the second determination can be performed as the respective determination processing.

The second determining processing may perform the second determination in a case where the first determining processing determines that the first vector intersects with the shielding object from the outside.

With this configuration, the processing load can be reduced with the second determination not performed in a case where the second determination is unnecessary.

A non-transitory storage medium according to one aspect has stored a game program for causing an information processing device to execute: player character control processing of moving a player character object in a virtual space based on an operation of a player; camera destination calculating processing of calculating a position of a destination of a virtual camera in the virtual space, in accordance with the movement of the player character object; shielding determining processing of determining whether a shielding object is present between the position of the destination and the player character object; collision determining processing of determining whether the position of the destination is inside the shielding object; camera moving processing of moving the virtual camera to a position on a side of the player character object from the shielding object when the shielding determining processing determines that the shielding object is present and the collision determining processing determines that the position of the destination is inside the shielding object; and image generating processing of generating an image of the virtual space to display the image indicating, on the shielding object, that the player character object is present, the player character object being shielded by the shielding object, when the shielding determining processing determines that the shielding object is present and the collision determining processing determines that the position of the destination is outside the shielding object.

With this configuration, avoidance control is performed in a case where the virtual camera moves to the inside of the shielding object, and no avoidance control is performed in a case where the virtual camera is outside the shielding object but the shielding object is present between the virtual camera and the player character object to shield the player character object. Thus, a sudden variation in the image can be avoided. In addition, the image indicating, on the shielding object, that the player character object is present, can be displayed. Thus, it can be confirmed whether the player character object is present, without the avoidance control.

An information processing device according to one aspect includes: a camera destination calculating unit configured to calculate a position of a destination of a virtual camera in a virtual space, based on predetermined information processing; a camera moving unit configured to move the virtual camera to an avoidance position at which a shielding object is avoided, in a case where a first vector heading from a position of an object to be captured by the virtual camera to the position of the destination, intersects with the shielding object from an outside in the virtual space and a second vector heading from the position of the destination to the position of the object to be captured by the virtual camera, does not intersect with the shielding object from the outside; and an image generating unit configured to generate an image of the virtual space, based on the virtual camera moved by the camera moving unit.

With this configuration, the virtual camera moves the avoidance position instead of the position of the destination that has been calculated, in the case where the position of the destination of the virtual camera that has been calculated is inside the shielding object. Thus, a natural variation in the image with the virtual camera can be achieved in comparison to a case where the virtual camera constantly moves to the avoidance position when the shielding object shields the object to be captured when viewed from the virtual camera. Determining whether the first vector heading from the position of the object to be captured to the position of the destination of the virtual camera and the second vector heading from the position of the destination of the virtual camera to the position of the object to be captured, each intersect the shielding object from the outside, determines whether the position of the destination of the virtual camera is inside the shielding object. Thus, the processing load of shielding avoidance control can be reduced in comparison to a case where it is directly determined whether the position of the destination of the virtual camera is inside the shielding object.

A game device according to one aspect includes: a player character control unit configured to move a player character object in a virtual space based on an operation of a player; a camera destination calculating unit configured to calculate a position of a destination of a virtual camera in the virtual space, in accordance with the movement of the player character object; a shielding determining unit configured to determine whether a shielding object is present between the position of the destination and the player character object; a collision determining unit configured to determine whether the position of the destination is inside the shielding object; a camera moving unit configured to move the virtual camera to a position on a side of the player character object from the shielding object when the shielding determining unit determines that the shielding object is present and the collision determining unit determines that the position of the destination is inside the shielding object; and an image generating unit configured to generate an image of the virtual space to display the image indicating, on the shielding object, that the player character object is present, the player character object being shielded by the shielding object, when the shielding determining unit determines that the shielding object is present and the collision determining unit determines that the position of the destination is outside the shielding object.

With this configuration, avoidance control is performed in a case where the virtual camera moves to the inside of the shielding object, and no avoidance control is performed in a case where the virtual camera is outside the shielding object but the shielding object is present between the virtual camera and the player character object to shield the player character object. Thus, a sudden variation in the image can be avoided. In addition, the image indicating, on the shielding object, that the player character object is present, can be displayed. Thus, it can be confirmed whether the player character object is present, without the avoidance control.

An information processing method according to one aspect includes: calculating a position of a destination of a virtual camera in a virtual space, based on predetermined information processing; moving the virtual camera to an avoidance position at which a shielding object is avoided, in a case where a first vector heading from a position of an object to be captured by the virtual camera to the position of the destination, intersects with the shielding object from an outside in the virtual space and a second vector heading from the position of the destination to the position of the object to be captured by the virtual camera, does not intersect with the shielding object from the outside; and generating an image of the virtual space, based on the virtual camera moved by the moving.

With this configuration, the virtual camera moves the avoidance position instead of the position of the destination that has been calculated, in the case where the position of the destination of the virtual camera that has been calculated is inside the shielding object. Thus, a natural variation in the image with the virtual camera can be achieved in comparison to a case where the virtual camera constantly moves to the avoidance position when the shielding object shields the object to be captured when viewed from the virtual camera. Determining whether the first vector heading from the position of the object to be captured to the position of the destination of the virtual camera and the second vector heading from the position of the destination of the virtual camera to the position of the object to be captured, each intersect the shielding object from the outside, determines whether the position of the destination of the virtual camera is inside the shielding object. Thus, the processing load of shielding avoidance control can be reduced in comparison to a case where it is directly determined whether the position of the destination of the virtual camera is inside the shielding object.

A game method according to one aspect includes: moving a player character object in a virtual space, based on an operation of a player; calculating a position of a destination of a virtual camera in the virtual space, in accordance with the movement of the player character object; determining whether a shielding object is present between the position of the destination and the player character object; determining whether the position of the destination is inside the shielding object; moving the virtual camera to a position on a side of the player character object from the shielding object when the determining whether the shielding object is present, determines that the shielding object is present and the determining whether the position of the destination is inside the shielding object, determines that the position of the destination is inside the shielding object; and generating an image of the virtual space to display the image indicating, on the shielding object, that the player character object is present, the player character object being shielded by the shielding object, when the determining whether the shielding object is present, determines that the shielding object is present and the determining whether the position of the destination is inside the shielding object, determines that the position of the destination is outside the shielding object.

With this configuration, avoidance control is performed in a case where the virtual camera moves to the inside of the shielding object, and no avoidance control is performed in a case where the virtual camera is outside the shielding object but the shielding object is present between the virtual camera and the player character object to shield the player character object. Thus, a sudden variation in the image can be avoided. In addition, the image indicating, on the shielding object, that the player character object is present, can be displayed. Thus, it can be confirmed whether the player character object is present, without the avoidance control.

The foregoing and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

An embodiment will be described below with reference to the drawings. Note that the embodiment to be described below indicates an example in a case where the present technology is performed, and thus the present technology is not limited to specific configurations to be described below. A specific configuration appropriate to the embodiment may be appropriately adopted in performing the present technology.

Figure 1:
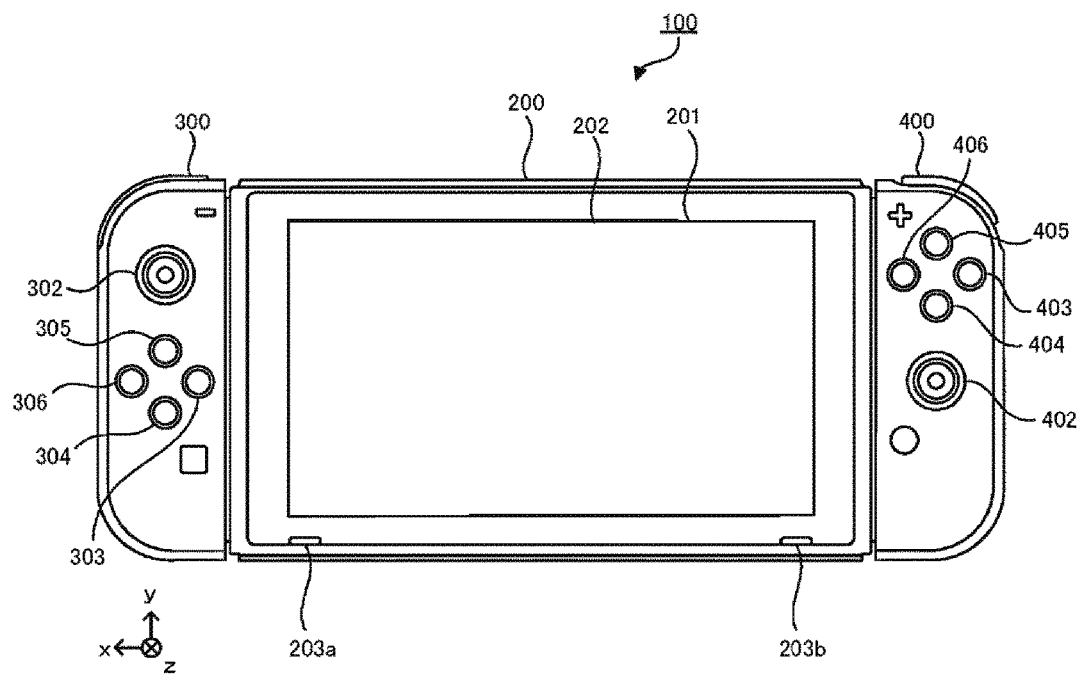
FIG. 1 is an external view of an information processing system according to an embodiment.

FIG. 1 is an external view of an information processing system according to the embodiment. According to the present embodiment, the information processing system includes a game system. The information processing system 100 includes a main device (an information processing device functioning as a main game device according to the present embodiment) 200, a left controller 300, and a right controller 400. The left controller 300 and the right controller 400 are collectively referred to as a "controller" below. The controller is detachably attachable to the main device 200. The left controller 300 is mounted on a left side surface of the main device 200 (a side surface on the positive side of an x axis illustrated in FIG. 1) and the right controller 400 is mounted on a right side surface of the main device 200 (a side surface on the negative side of the x axis illustrated in FIG. 1).

The main device 200 performs various types of processing (e.g., game processing) in the information processing system 100. The main device 200 includes a display 201. The controller includes a device including an operation unit through which a user inputs.

The main device 200 is substantially plate-shaped, and the front surface of the main device 200 is substantially rectangular in shape. The display 201 is provided on the front surface of a housing 11. The display 201 displays an image generated by the main device 200. According to the present embodiment, the display 201 includes a liquid crystal display (LCD). However, the display 201 may include an arbitrary type of display device.

The main device 200 includes a touch panel 202 on a screen of the display 201. According to the present embodiment, the touch panel 202 has a type capable of multi-touch input (e.g., an electrostatic capacitance type). However, the touch panel 202 may have an arbitrary type, for example, a type capable of single touch input (e.g., a resistive film type).

The main device 200 includes a speaker (not illustrated) inside and speaker holes 203a and 203b for outputting speaker sounds, formed on a main surface. A slot (not illustrated) into which a storage medium can be inserted and a power button (not illustrated) are provided on an upper side surface of the main device 200.

A mechanism for detachably attaching the left controller 300 and a terminal for wired communication with the left controller 300 are provided on a side surface on the left side of the main device 200. A mechanism for detachably attaching the right controller 400 and a terminal for wired communication with the right controller 400 are provided on a side surface on the right side of the main device 200. A lower side terminal (not illustrated) for wired communication with a cradle 500 (refer to FIG. 3), is provided on a bottom surface of the main device 200.

The left controller 300 includes an analog stick 302 on a front surface. The analog stick 302 can be used as a direction input unit capable of inputting a direction. The analog stick 302 includes a stick member inclinable in all directions parallel to the front surface of the left controller 300 (namely, a direction of 360° including an upper and lower direction, a left and right direction, and oblique directions). The user (hereinafter, a user who plays a game is also referred to as a "player") inclines the stick member so that input of a direction corresponding to an inclined direction can be performed (additionally, input of the magnitude corresponding to an angle at which the inclination has been made). Note that, instead of the analog stick 302, a cross key or a slide stick capable of slide input may be provided as the direction input unit.

The left controller 300 includes four operation buttons 303 to 306 (specifically, a right direction button 303, a downward direction button 304, an upward direction button 305, and a left direction button 306). The analog stick 302 and the operation buttons 303 to 306 are used for issuing an instruction appropriate to various programs (e.g., an OS program and an application program) executed in the main device 200.

The right controller 400 includes an analog stick 402 and four operation buttons 403 to 406 (specifically, an A button 403, a B button 404, an X button 405, and a Y button 406) on a front surface. A configuration of the analog stick 402 is the same as that of the analog stick 302 of the left controller 300.

As illustrated in FIG. 1, the analog stick 302 and the operation buttons 303 to 306 each are arranged so that the analog stick 302 is positioned on the upper side and the four operation buttons 303 to 306 are positioned lower than the analog stick 302 when the left controller 300 is mounted on the main device 200. Conversely, the analog stick 402 and the operation buttons 403 to 406 are provided so that the analog stick 402 is positioned on the lower side and the four operation buttons 403 to 406 are positioned upper than the analog stick 402 when the right controller 400 is mounted on the main device 200.

Figure 2:
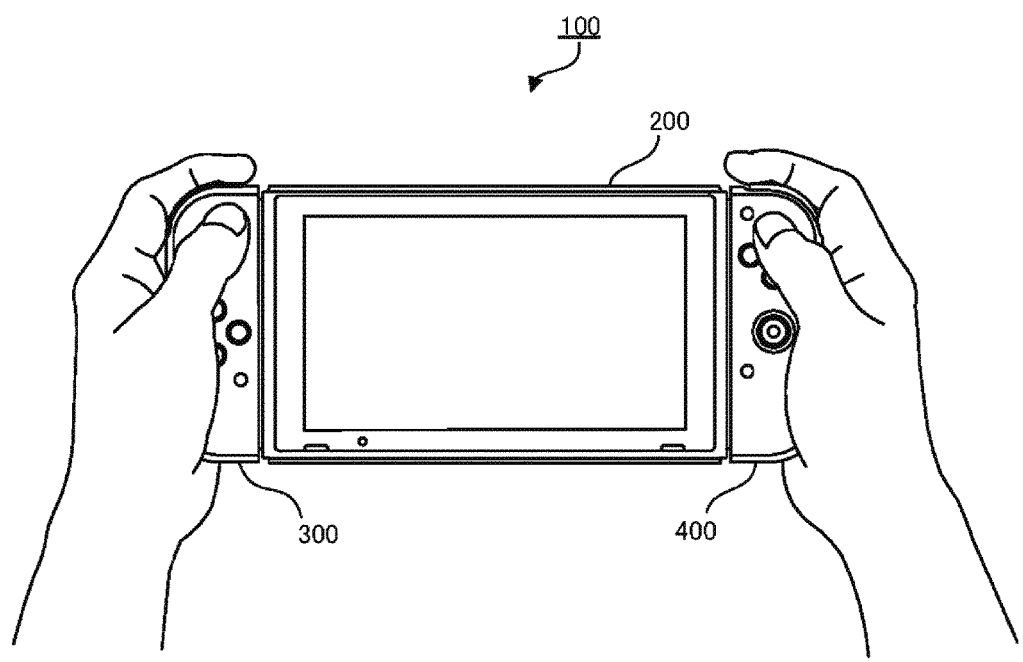
FIG. 2 is a view illustrating an exemplary usage mode of the information processing system according to the embodiment.
Figure 3:
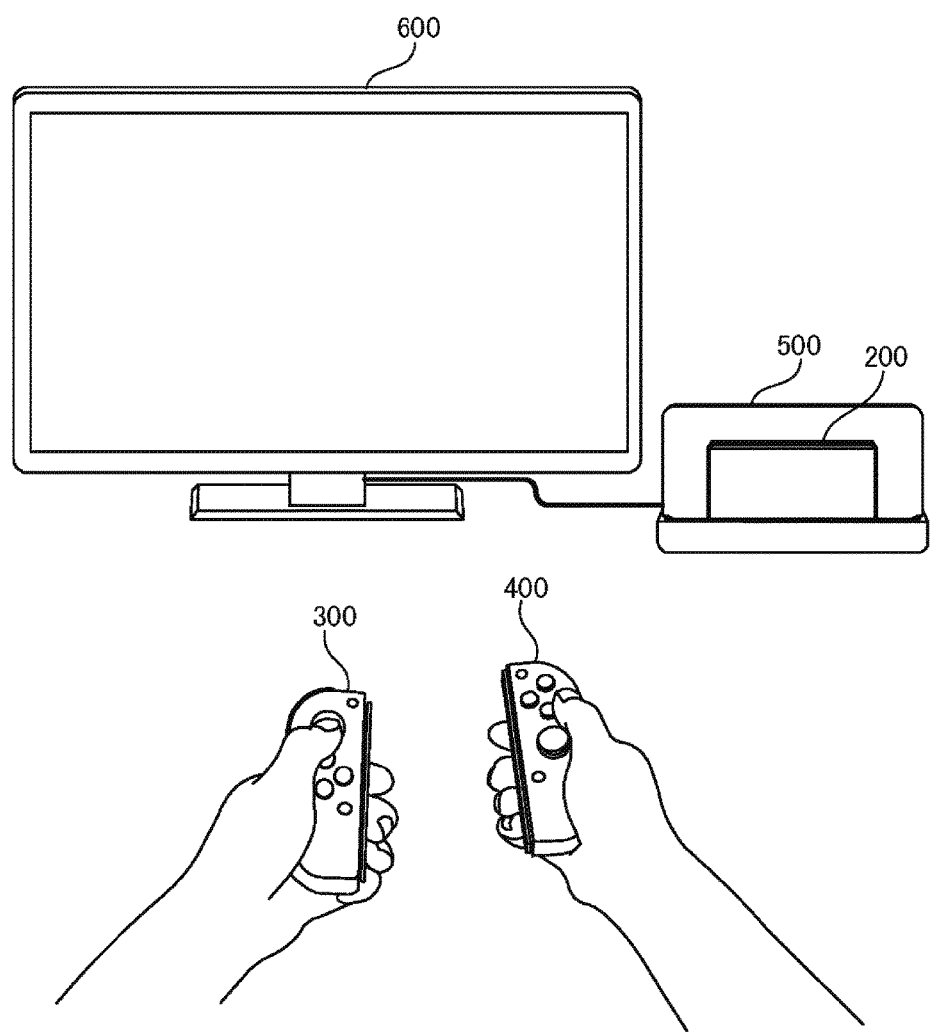
FIG. 3 is a view illustrating an exemplary usage mode of the information processing system according to the embodiment.

FIGS. 2 and 3 are views illustrating exemplary usage modes of the information processing system 100. FIG. 2 illustrates the usage mode in which the left controller 300 and the right controller 400 are mounted on the main device 200 so as to be used as an integrated device. FIG. 3 illustrates the usage mode in which the left controller 300 and the right controller 400 are used being separated from the main device 200.

As illustrated in FIG. 2, in a case where the left controller 300 and the right controller 400 are used as the integrated device, the user holds the left controller 300 with the left hand and holds the right controller 400 with the right hand. At this time, the display 201 is positioned between the left hand and the right hand. As described above, since the analog stick 302 is positioned on the upper side of the left controller 300 and the operation buttons 403 to 406 are positioned on the upper side of the right controller 4, the user can operate the analog stick 302 with the thumb of the left hand and can operate the operation buttons 403 to 406 with the thumb of the right hand.

As illustrated in FIG. 3, in a case where playing the game alone with the controller removed from the main device 200, the player holds the left controller 300 with the left hand and holds the right controller 400 with the right hand. At this time, the main device 200 may be installed in the cradle 500. The main device 200 is coupled to the cradle 500 through the lower side terminal. The main device 200 is coupled to a stationary monitor 600 (e.g., a stationary television) being an exemplary external display device through the cradle 500 so that an image to be displayed on the display 201 can be displayed on the stationary monitor 600. Note that, in a case where the controller is used being removed from the main device 200, the image may be displayed on the display 201 with the main device 200 not installed in the cradle 500. Note that, in a case where the controller has been removed from the main device 200, one player holds the left controller 300 and the other player holds the right controller 400 so that the two players can play the game.

As illustrated in FIG. 2, in a case where the controller is mounted on the main device 200, an operation signal indicating an operation of the user with respect to the controller, is transmitted to the main device 200 with the wired communication through the terminals on the side surfaces of the main device 200. Meanwhile, as illustrated in FIG. 3, in a case where the controller is used being removed from the main device 200, the operation signal from the controller is wirelessly transmitted to the main device 200.

Figure 4:
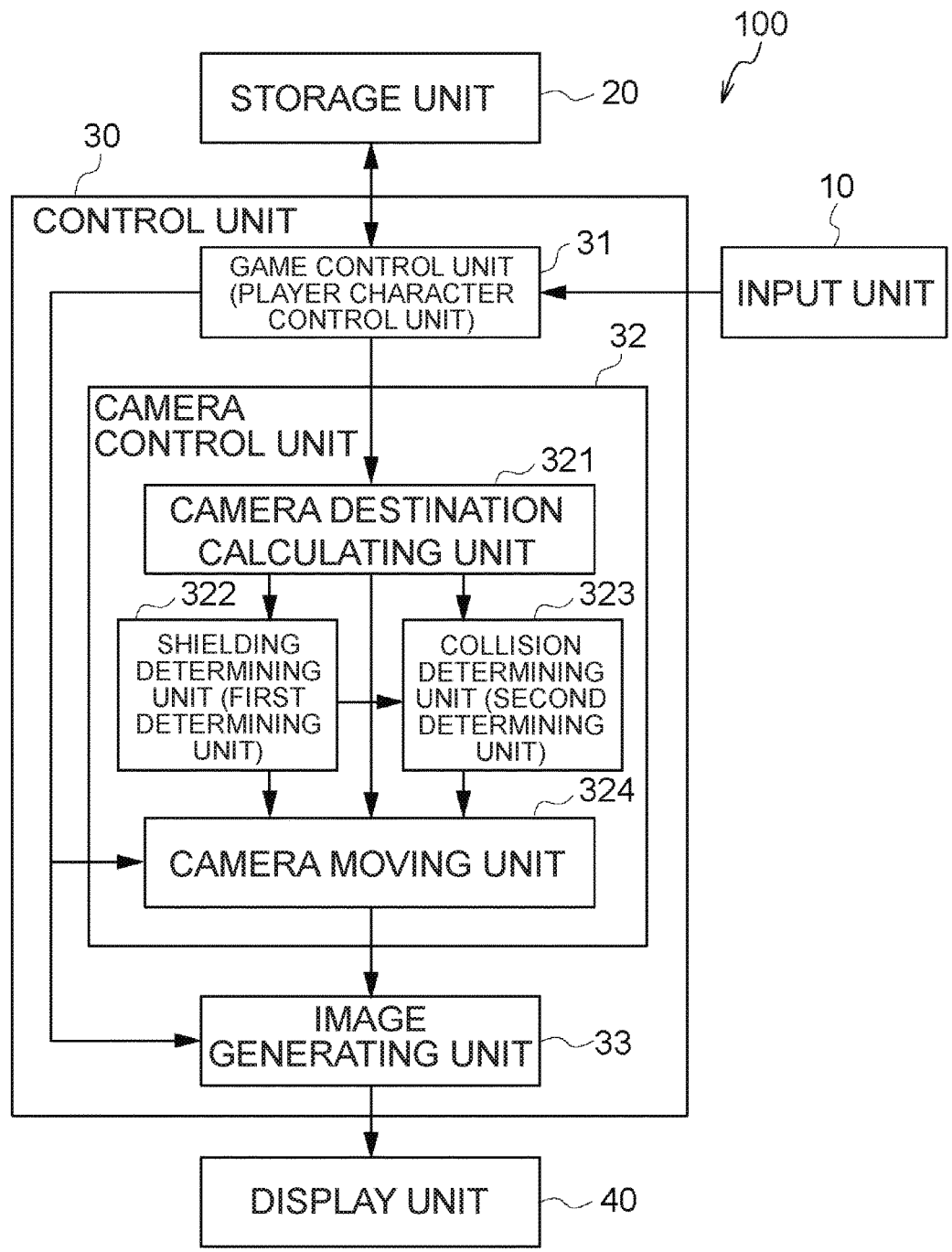
FIG. 4 is a block diagram illustrating a configuration of the information processing system according to the embodiment.

FIG. 4 is a block diagram illustrating an internal configuration of the information processing system 100. FIG. 4 illustrates the configuration necessary for describing the present embodiment. The information processing system 100 includes an input unit 10, a storage unit 20, a control unit 30, and a display unit 40. The input unit 10 corresponds to the controller, and the storage unit 20 and the control unit 30 are included in the main device 200. In a case where the information processing system 100 includes the integrated device as illustrated in FIG. 2, the display unit 40 corresponds to the display 201. In a case where the information processing system 100 includes the stationary monitor 600 as illustrated in FIG. 3, the display unit 40 corresponds to the stationary monitor 600. Note that the storage unit 20 and each element in the control unit 30 may be distributed in arrangement, and furthermore, the elements that have been distributed may be connected to each other through a communication network.

The storage unit 20 corresponds to a flash memory and a dynamic random access memory (DRAM). The flash memory is mainly used for storing various types of data (including the programs) stored in the main device 200. The DRAM is used for temporarily storing various types of data used for information processing in the control unit 30.

The control unit 30 includes a CPU as described above. The control unit 30 includes a game control unit 31, a camera control unit 32, and an image generating unit 33. The CPU executes an information processing program according to the present embodiment (a game program according to the present embodiment) stored in the storage unit 20 so that the respective functions of the units in the control unit 30 are achieved.

In accordance with the game program, the game control unit 31 performs game processing on the basis of the operation signal from the input unit 10. A player character moves in a three-dimensional virtual space so that the game according to the present embodiment develops. In particular, the player inputs an operation (e.g., an inclination of the analog stick 302) to the input unit 10 so that the player character can move in the virtual space. That is, since the game control unit 31 moves the player character in the virtual space on the basis of the operation input of the player, the game control unit 31 can be referred to as a player character control unit.

In addition, a virtual camera is set in the virtual space, and the image generating unit 33 generates an image to be acquired by virtually capturing with the virtual camera.

The camera control unit 32 controls the position and direction of the virtual camera in the virtual space. That is, the camera control unit 32 moves the virtual camera in the virtual space. During the game, the virtual camera basically moves in the virtual space together with movement of a player character object P moved by the player, with the player character object P as an object to be captured. The camera control unit 32 controls the movement of the virtual camera on the basis of a result of the game processing in the game control unit 31, a determined result of a shielding determining unit 322, and a determined result of a collision determining unit 323. Note that the virtual camera may be further capable of adjusting a visual angle. In this case, the camera control unit 32 also controls the visual angle of the virtual camera.

The image generating unit 33 generates the image to be virtually shot by the virtual camera controlled by the camera control unit 32. The image that has been generated is output to the display unit 40 so as to be displayed on the display unit 40. The player views the display unit 40 so as to be able to visually grasp the state of the virtual space including the player character object P.

A configuration of controlling the movement of the virtual camera to generate the image, in the camera control unit 32, will be described with reference to FIGS. 5 to 9 together with FIG. 4. FIGS. 5 to 8 are diagrams illustrating the virtual space. Note that FIGS. 5 to 9 illustrate the virtual space two-dimensionally, but the virtual space provided in the game system 100 according to the present embodiment, is three-dimensional. FIGS. 5 to 9 illustrate the virtual camera, but an object including the camera is not set in the virtual space in practice, and the virtual camera is defined with camera parameters, such as the position of a visual point (a focal point), the direction of a visual line (an optical axis), and a visual angle.

Figure 6:
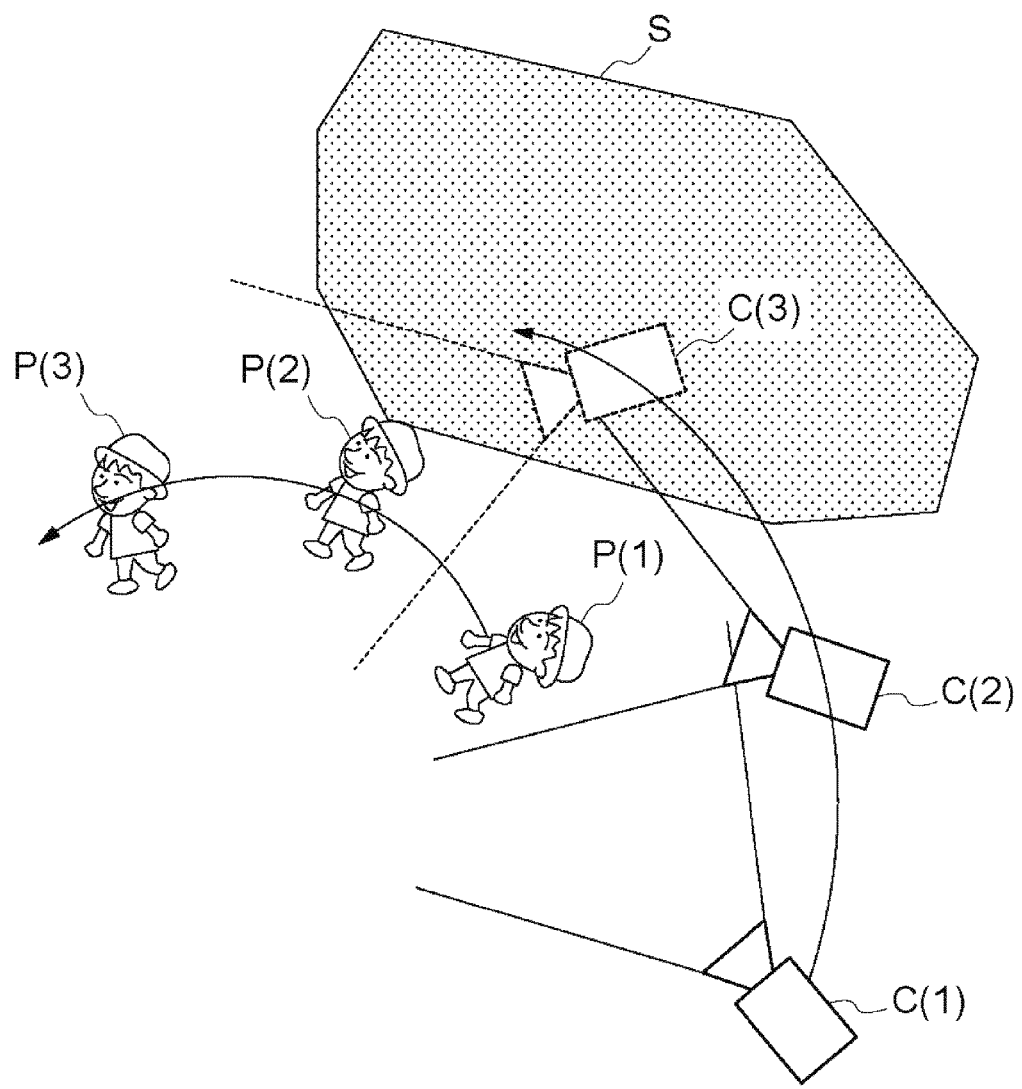
FIG. 6 is a diagram illustrating a case where the position of a destination of the virtual camera is inside a shielding object in the virtual space according to the embodiment.

FIG. 6 illustrates a plurality of the player character objects P and a plurality of the virtual cameras C in order to describe the positional relationship between the plurality of the player character objects P and the plurality of the virtual cameras C. One player character object P and one virtual camera C move in the virtual space in the game according to the present embodiment.

Figure 5:
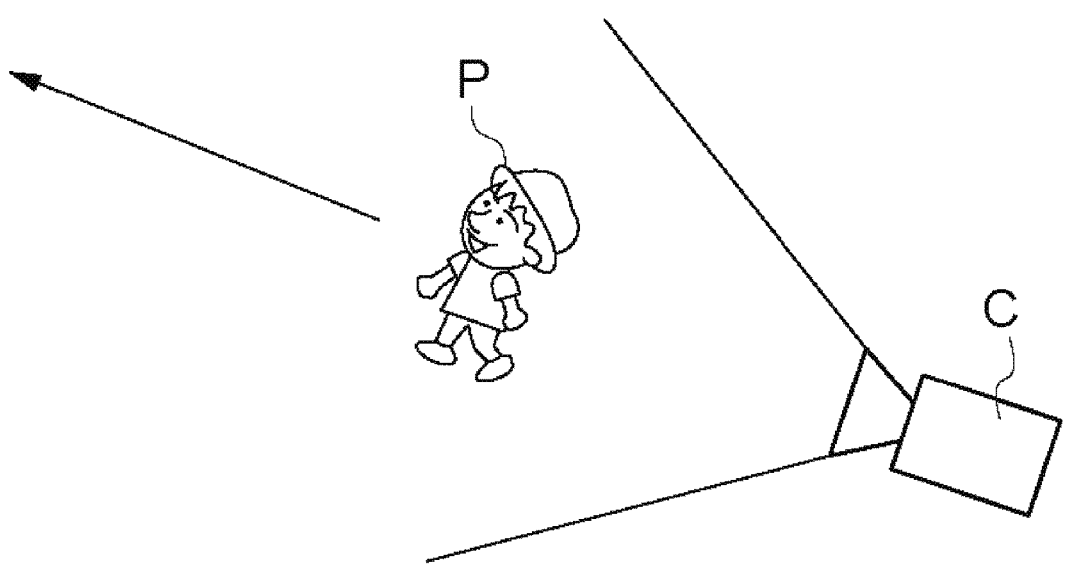
FIG. 5 is a diagram illustrating the basic positional relationship between a player character object and a virtual camera in a virtual space according to the embodiment.

FIG. 5 illustrates the basic positional relationship between the player character object P and the virtual camera C. As described above, the player inputs an operation to the input unit 10 so as to be able to issue an instruction for moving the player character object P in the virtual space. As described above, the virtual camera C moves in accordance with the movement of the player character object P. More specifically, the virtual camera C moves so as to follow the player character object P from the back side of the player character object P in traveling direction (follow-up control).

The game control unit 31 performs game processing on the basis of the operation input of the player with respect to the input unit 10, and moves the player character object P to acquire a current position. Then, the game control unit 31 outputs the current position to the camera control unit 32. A camera destination calculating unit 321 of the camera control unit 32 performs information processing of the follow-up control so as to calculate the position of a destination of the virtual camera C in the virtual space.

Note that the camera destination calculating unit 321 may calculate the destination of the virtual camera C in accordance with an instruction of the player for moving the camera C, with respect to the input unit 10. For example, the virtual camera C may move in a direction in which the analog stick 302 has inclined. In this case, the camera destination calculating unit 321 calculates the position of the destination of the virtual camera C on the basis of the input from the input unit 10.

As illustrated in FIG. 6, in a case where the player character object P moves with the trajectory of P(1), P(2), and P(3), the camera destination calculating unit 321 calculates the position of the destination of the virtual camera C in order of C(1), C(2), and C(3). However, when the camera destination calculating unit 321 calculates, with the follow-up control, the destination of the virtual camera C in accordance with the movement of the player character object P, the virtual camera C is positioned inside a shielding object S like the virtual camera C(3) with respect to the player character object P(3). According to the present embodiment, the shielding object S includes a terrain or a rock set in the virtual space, and the player character object P or the virtual camera C is designed not to enter the inside of the terrain or the rock.

Figure 7:
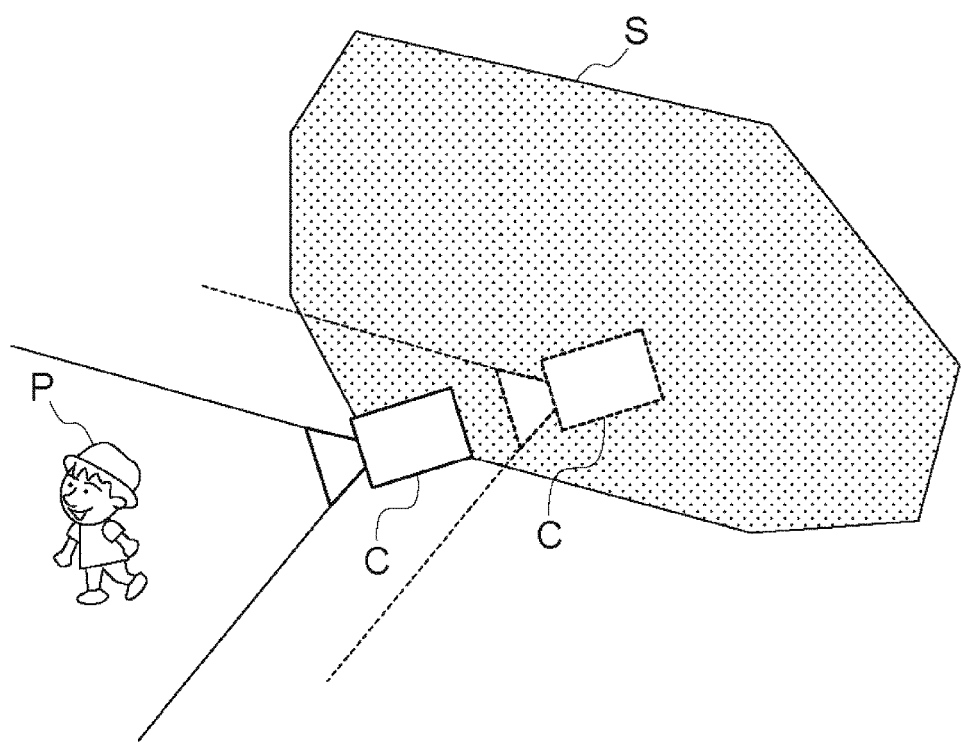
FIG. 7 is a diagram illustrating a state where shielding avoidance control moves the virtual camera to an avoidance position in the virtual space according to the embodiment.

In a case where the position of the destination of the virtual camera C is inside the shielding object S like the virtual camera C(3) in FIG. 6, the camera control unit 32 according to the present embodiment moves the virtual camera C to a position (an avoidance position) at which the shielding object S is avoided (shielding avoidance control). FIG. 7 is a diagram illustrating a state where the shielding avoidance control moves the virtual camera C to the position at which the shielding object S has been avoided. The avoidance position is positioned on a line connecting a position C' of the destination of the virtual camera C that has been calculated with the player character object P, and is positioned between the player character object P and the shielding object S.

Note that, as illustrated in FIG. 7, the shielding avoidance control makes the virtual camera C approach the player character object P from the position C' of the destination that has been calculated (namely, the original position of the virtual camera C). Thus, the avoidance position is desirably as far away from the player character object P as possible. Therefore, the avoidance position is desirably set to bring the visual point of the virtual camera C to the point farthest from the player character object P between the player character object P and the shielding object S, namely, the point at which the line connecting the position C' of the destination of the virtual camera C that has been calculated with the player character object P intersects with the surface of the shielding object S.

Figure 8:
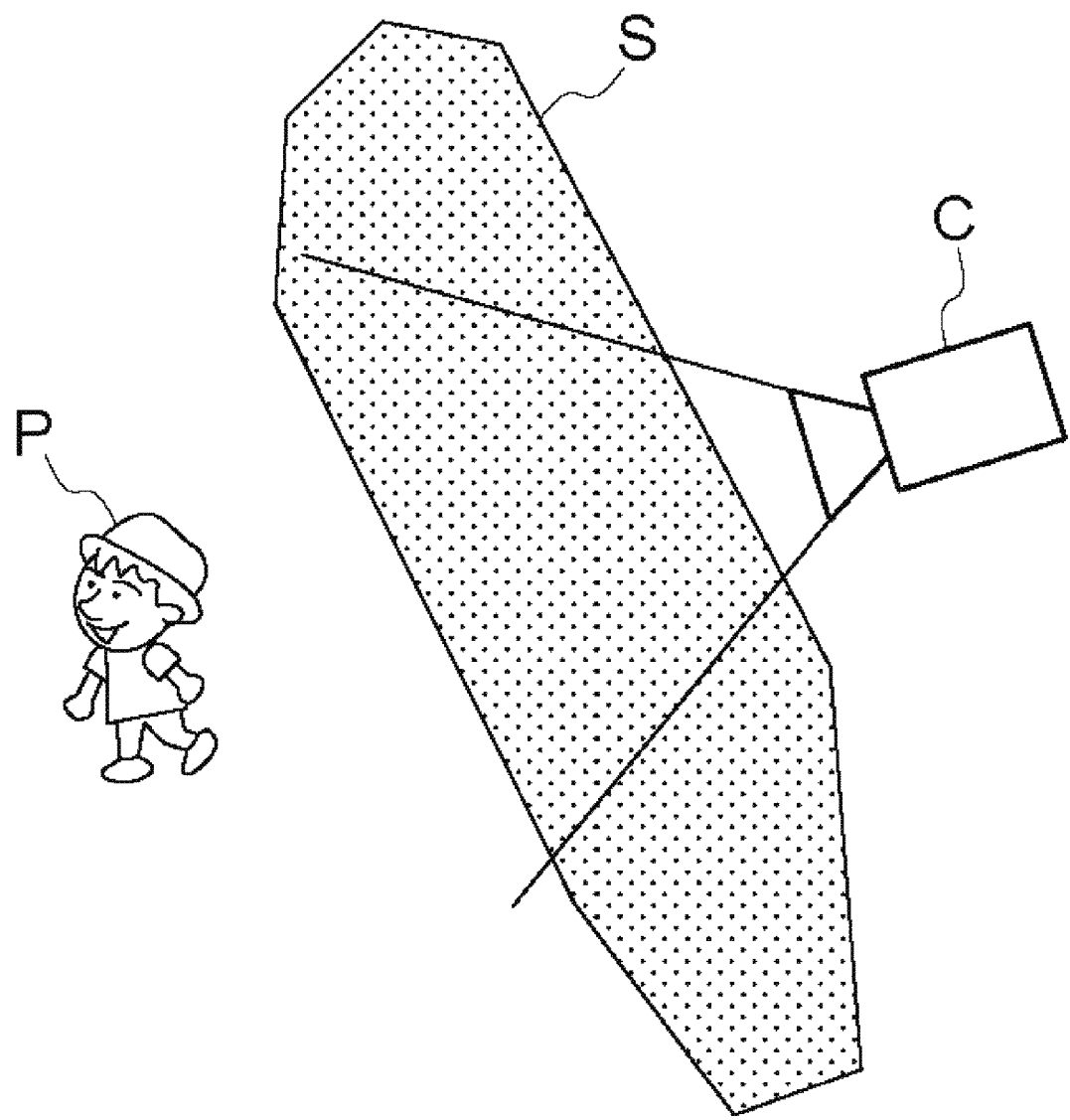
FIG. 8 is a diagram illustrating a case where the shielding object is present between the virtual camera and the player character object in the virtual space according to the embodiment.

Meanwhile, as illustrated in FIG. 8, even in a case where the shielding object S is present between the virtual camera C and the player character object P, when the virtual camera C is out of the shielding object S, the camera control unit 32 performs no shielding avoidance control.

Here, the surfaces of the objects including the shielding object S in the virtual space are defined with polygonal data, and information distinguishing an outer surface and an inner surface is given to each piece of the polygonal data included in each object. The image generating unit 33 performs rendering to the polygonal data of an object in the visual angle (the visual field) of the virtual camera C so that the object is drawn in the image.

The information distinguishing the inner and outer surfaces of each piece of the polygonal data is given as the normal vector of the polygonal data. That is, a normal vector is set to the outer surface of each piece of the polygonal data. Therefore, when the position (the coordinates) of the destination of the virtual camera C is calculated, whether the position is inside or outside the shielding object S can be determined by calculation.

However, the calculation that determines whether certain coordinates are inside or outside a certain object, has a relatively heavy load, and consumes a resource, such as the CPU. Thus, the calculation leads to a bottleneck against the game processing or an improvement in the frame rate of image display. Therefore, according to the present embodiment, a method of performing calculation having a relatively light load to determine whether the position of the destination of the virtual camera C is inside or outside the shielding object S, is adopted.

Referring back to FIG. 4, a configuration of determining whether the position of the destination of the virtual camera C is inside or outside the shielding object S, will be described. The camera control unit 32 determines whether the shielding object S is present between the position of the destination of the virtual camera C and the player character object P (first determination), and determines whether the position of the destination of the virtual camera C is inside the shielding object S (second determination).

The shielding determining unit (a first determining unit) 322 determines whether the shielding object S is present between the position of the destination of the virtual camera C and the player character object P (the first determination). The presence of the shielding object S between the position of the destination of the virtual camera C and the player character object P means a case where the position of the destination of the virtual camera C is inside the shielding object S like the virtual camera C(3) in FIG. 6 and a case where the position of the destination of the virtual camera C is outside the shielding object S and the shielding object S is present between the virtual camera C and the player character object P like the virtual camera C in FIG. 8.

The collision determining unit (a second determining unit) 323 determines whether the position of the destination is inside the shielding object S (a collision state) (the second determination). Note that, as described above, a case where the shielding determining unit 322 determines that the shielding object S is present between the position of the destination of the virtual camera C and the player character object P, includes a case where the position of the destination of the virtual camera C is inside the shielding object S. In the case where the position of the destination of the virtual camera C is inside the shielding object S, it is determined that the shielding object S is present between the position of the destination of the virtual camera C and the player character object P.

That is, in a case where the first determination determines that the shielding is present, the second determination may determine that the collision state has been made. Therefore, the second determination in the collision determining unit 323 is performed in a case where the first determination in the shielding determining unit 322 determines that the shielding is present. Therefore, the collision determining unit 323 receives a result of the first determination of the shielding determining unit 322, and performs the second determination in a case where the first determination has determined that the shielding is present.

Figure 9:
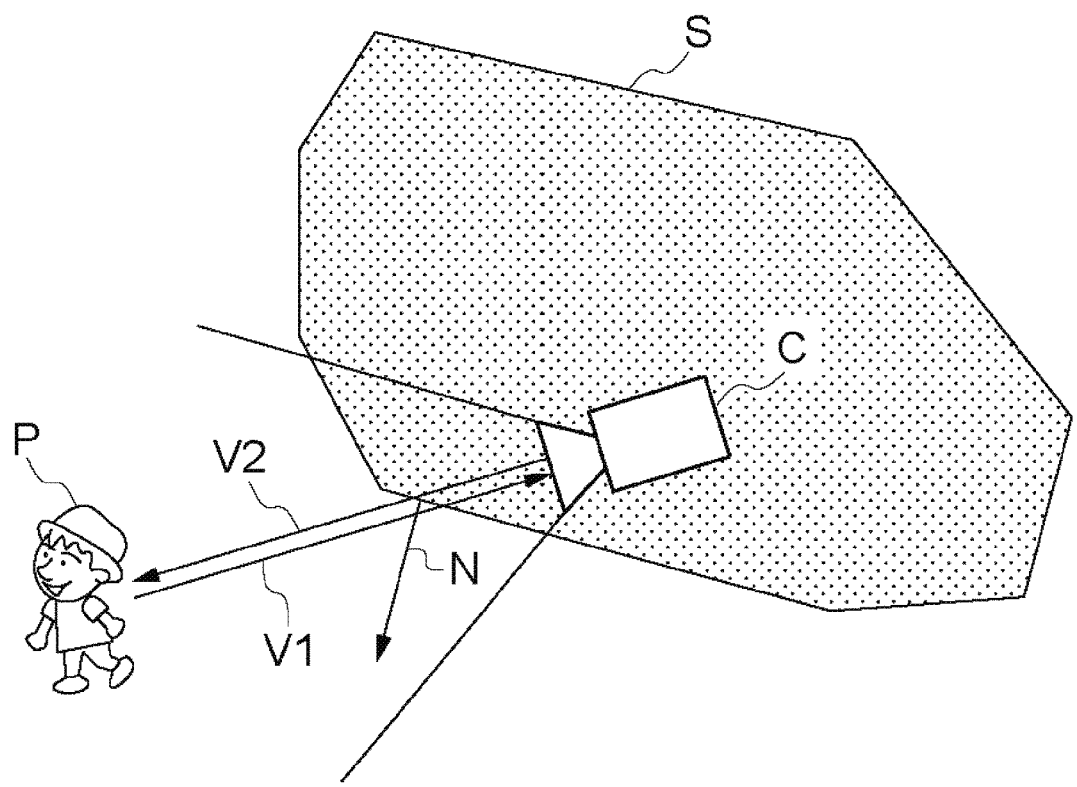
FIG. 9 is a diagram for describing processing in a shielding determining unit and processing in a collision determining unit according to the embodiment.

FIG. 9 is a diagram for describing processing in the shielding determining unit 322 and processing in the collision determining unit 323. The shielding determining unit 322 determines whether a vector (a first vector) V1 heading from the player character object P to the position of the destination of the virtual camera C intersects with the shielding object S from the outside of the shielding object S. Specifically, the shielding determining unit 322 specifies a polygon (an intersecting polygon) intersecting with the first vector V1, among the polygons including in the surface of the shielding object S, so as to specify the normal vector N of the intersecting polygon. The shielding determining unit 322 calculates the inner product of the first vector V1 and the normal vector N. When the inner product has a negative value, the shielding determining unit 322 determines that the first vector V1 intersects with the shielding object S from the outside.

The collision determining unit 323 determines whether a vector (a second vector) V2 heading from the position of the destination of the virtual camera C to the player character object P intersects with the shielding object S from the outside of the shielding object S. Specifically, the collision determining unit 323 specifies an intersecting polygon intersecting with the second vector V2, among the polygons included in the surface of the shielding object S, so as to specify the normal vector N of the intersecting polygon. The collision determining unit 323 calculates the inner product of the second vector V2 and the normal vector N. When the inner product has a negative value, the collision determining unit 323 determines that the second vector V2 intersects with the shielding object S from the outside (no collision state). When the inner product has a positive value, the collision determining unit 323 determines that the second vector V2 intersects with the shielding object S from the inside (the collision state).

Note that FIG. 9 illustrates that the first vector V1 and the second vector V2 are slightly shifted from each other. However, according to the present embodiment, the first vector V1 and the second vector V2 overlap each other in practice, and the start point and the end point of the first vector V1 are opposite to those of the second vector V2. Thus, the intersecting polygon intersecting with the first vector V1 and the intersecting polygon intersecting with the second vector V2 are the same. The start point of the first vector V1 and the end point of the second vector V2 are not necessarily set to the player character object P exactly, and thus may be set to, for example, coordinate above the player character object P. In addition, the end point of the first vector V1 and the start point of the second vector V2 can be set to the visual point of the virtual camera C, but are not necessarily set to the visual point of the virtual camera C exactly. The first vector V1 and the second vector V2 do not necessarily overlap each other completely.

As illustrated in FIG. 8, in a case where the position of the destination of the virtual camera C is outside the shielding object S, two intersecting polygons are present. When the inner product of the normal vector N of an intersecting polygon with which the first vector V1 first intersects between the start point and the end point, and the first vector V1, has a negative value, the shielding determining unit 322 determines that the shielding object S is present between the player character object P and the position of the destination of the virtual camera C. When the inner product of the normal vector N of an intersecting polygon with which the second vector V2 first intersects between the start point and the end point, and the second vector V2, has a positive value, the collision determining unit 323 determines that the position of the destination of the virtual camera C is inside the shielding object S.

Note that, the shielding determining unit 322 may calculate the inner product of each normal vector of the plurality of intersecting polygons and the first vector V1. When at least one of the inner products is negative, the shielding determining unit 322 may determines that the first vector V1 intersects with the shielding object S from the outside. In a case where the number of the intersecting polygons having a positive inner product is larger than the number of the intersecting polygons having a negative inner product, the collision determining unit 323 may determine that the position of the destination of the virtual camera C is inside the shielding object S.

The shielding determining unit 322 outputs the result of the first determination to a camera moving unit 324. The collision determining unit 323 outputs a result of the second determination to the camera moving unit 324. When the result of the first determination indicates that no shielding is present and the result of the second determination indicates that no collision state has been made, the camera moving unit 324 moves, in practice, the virtual camera C to the position of the destination calculated by the camera destination calculating unit 321.

Meanwhile, when the result of the first determination indicates that the shielding is present and the result of the second determination indicates that the collision state has been made, the camera moving unit 324 moves the virtual camera C to the avoidance position like the virtual camera C in FIG. 7 instead of the position calculated by the camera destination calculating unit 321. Specifically, the camera moving unit 324 moves the virtual camera C so that the visual point is positioned at the point at which the line connecting the position of the destination of the virtual camera C calculated by the camera destination calculating unit 321 with the player character object P determined by the game control unit 31, intersects with the surface of the shielding object S (namely, the intersecting polygon). At the avoidance position, the virtual camera C can capture the player character object P being the object to be captured, without being shielded by the shielding object S.

Note that, as described above, according to the present embodiment, since the second determination is performed when the first determination determines that the shielding is present, the camera moving unit 324 may determine whether to move the virtual camera C to the avoidance position or the position of the destination calculated by the camera destination calculating unit 321, with reference to the result of the second determination. In a case where no player character object P being the object to be captured enters the inside of the shielding object S during the game processing, the first vector V1 has no point at which intersecting with the shielding object S from the inside of the shielding object S, in the first determination. Thus, the shielding determining unit 322 may determine whether the first vector V1 intersects with the shielding object S at one point or more (whether at least one intersecting polygon is present).

According to the present embodiment, the second determination of the collision determining unit 323 is performed in a case where the first determination of the shielding determining unit 322 determines that the shielding object S is present, but the first determination and the second determination may be performed in parallel.

On the basis of the result of the game processing in the game control unit 31 and the virtual camera C moved by the camera moving unit 324, the image generating unit 33 generates the image to be acquired by virtually capturing the virtual space with the virtual camera C. The image that has been generated is output to the display unit 40 so that the display unit 40 displays the image.

Figure 10:
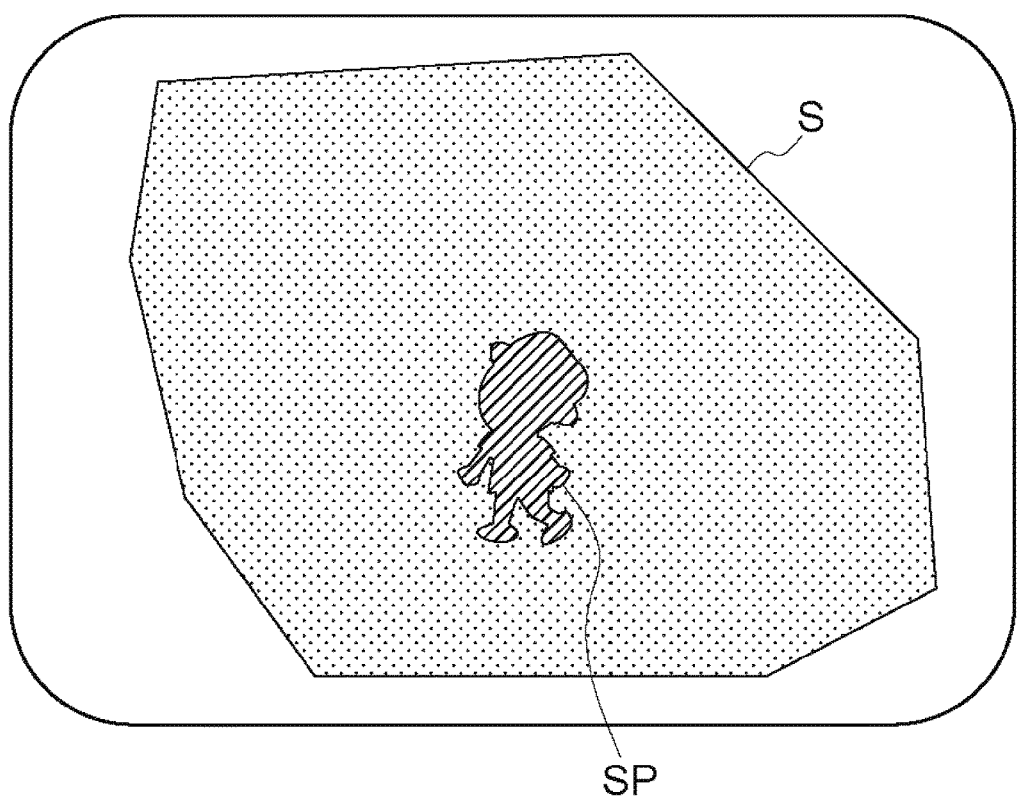
FIG. 10 is a diagram illustrating an exemplary image displayed on a display unit according to the embodiment.

FIG. 10 is a diagram illustrating an exemplary image displayed on the display unit 40. In the example of FIG. 10, the shielding object S is present between the player character object P and the virtual camera C as illustrated in FIG. 8, and the shielding object S shields the player character object P when viewed from the virtual camera C. The image expresses a portion of the player character object P shielded by the shielding object S, with a silhouette SP. The silhouette SP indicates the position of the player character object P in the virtual space.

Note that, in the example of FIG. 10, the player character object P is displayed with the silhouette in a case where the shielding object S shields the player character object P. However, for example, making the shielding object S translucent, may display the position of the player character object P. In the example of FIG. 10, the silhouette display is performed with the player character object P retained in shape. However, the position of the player character object P may be indicated with a mark expressing no shape of the player character object P.

Figure 11:
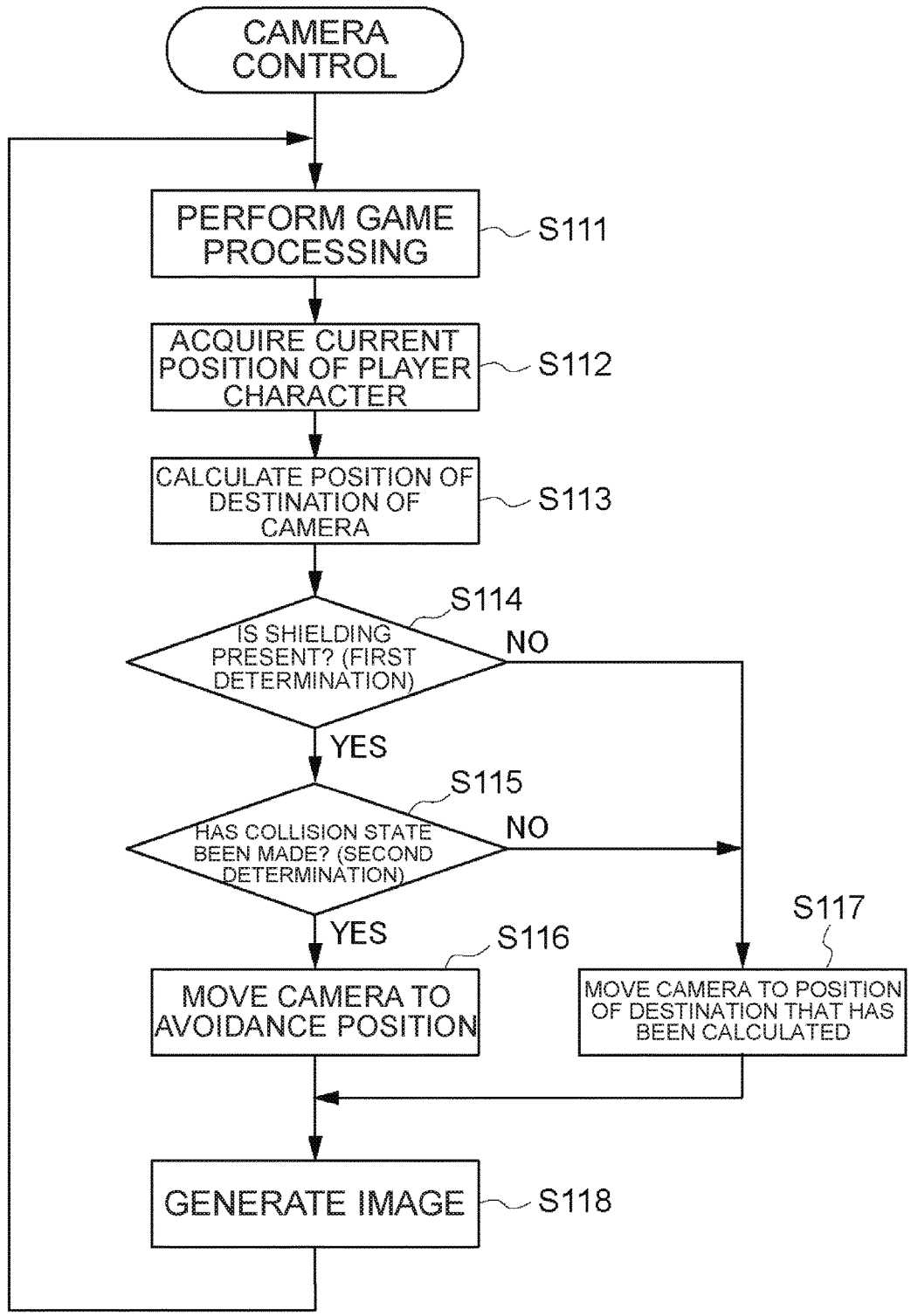
FIG. 11 is a flowchart of processing in a control unit according to the embodiment.

FIG. 11 is a flowchart of processing in the control unit 30. The game control unit 31 acquires the operation input of the player from the input unit 10 and performs the game processing in accordance with the game program stored in the storage unit 20 (step S111). The result of the game processing including the position of the player character object P is output to the camera destination calculating unit 321, the camera moving unit 324, and the image generating unit 324.

The camera destination calculating unit 321 acquires the current position and direction of the player character object P that has moved with the result of the game processing (step S112), and calculates the position of the destination of the virtual camera C in a case where the follow-up control is performed (step S113). Next, on the basis of the player character object P, the shielding object S, and the position of the destination of the virtual camera C, the shielding determining unit 322 determines whether the first vector V1 intersects with the shielding object S from the outside (the first determination), namely, whether the shielding object S is present between the player character object P and the position of the destination of the virtual camera C (step S114).

In a case where the shielding object S is present between the player character object P and the virtual camera C (YES at step S114), on the basis of the player character object P, the shielding object S, and the position of the destination of the virtual camera C, the collision determining unit 323 determines whether the second vector V2 intersects with the shielding object S from the inside (at the point at which the first intersection with the shielding object S is made) (the second determination), namely, whether the position of the destination of the virtual camera C is inside the shielding object S (whether the collision state has been made) (step S115).

In a case where it is determined that the position of the destination of the virtual camera C has been brought in the collision state with respect to the shielding object S (YES at step S115), the camera moving unit 324 moves the virtual camera C to the avoidance position from the destination (step S116). The virtual camera C moves so that the visual point is positioned at the point at which the first intersection with the shielding object S is made, the point being determined by the second determination.

In a case where the first determination of the shielding determining unit 322 determines that no shielding object S is present between the player character object P and the position of the destination of the virtual camera C (NO at step S114) and in a case where the second determination of the collision determining unit 323 determines that the position of the destination of the virtual camera C is out of the collision state with respect to the shielding object S (outside the shielding object S) (NO at step S115), the camera moving unit 324 moves the virtual camera C to the position of the destination calculated for the follow-up control by the camera destination calculating unit 321 (step S117).

When the camera moving unit 324 moves the virtual camera C at step S116 or step S117, the image generating unit 33 generates the image of the virtual space on the basis of the virtual camera C that has moved and the result of the game processing. At this time, when it is determined that no collision state has been made but the shielding is present (YES at step S114 and then NO at step S115), the image generating unit 33 generates the image including the portion of the player character object P indicated with the silhouette.

The control unit 30 repeatedly performs the processing at the processing rate of the game processing in the game control unit 31 or at the frame rate of the image in the image generating unit 33. That is, the flow in FIG. 11 (steps S111 to S118) repeats at a processing rate or a frame rate (e.g., ⅟60 seconds).

As described above, the information processing system (the game system) 100 according to the present embodiment, determines whether the position of the destination of the virtual camera C is inside the shielding object S (whether the collision state has been made), with the presence or absence of an intersecting polygon and the calculation of the inner product of the vectors with respect to the intersecting polygon, so that a processing load can be reduced.

The follow-up control continues in a case where the position of the destination of the virtual camera C is out of the shielding object S (no collision state has been made). Thus, the movement of the virtual camera C is more natural and the variation of the image generated by the image generating unit 33 is more natural (a video).

Furthermore, the player character object P is displayed with the silhouette in a case where the shielding object S shields the player character object P being the object to be captured. Thus, the position and the movement of the player character object P can be confirmed even in a case where the player character object P has been shielded.

According to the embodiment, the information processing system 100 applied to the game system has been exemplarily described. However, the information processing system 100 is not limited to the game system, and may be applied to, for example, a system that provides virtual reality or a simulation system that simulates a real space.

I claim:

1. An information processing system comprising:
   a processor; and
   a memory configured to store computer readable instructions that, when executed by the processor, cause the information processing system to:
   calculate a position of a destination of a virtual camera in a virtual space based on predetermined information processing;
   move the virtual camera to an avoidance position at which a shielding object is avoided, in a case where (a) a first vector heading from a position of an object to be captured by the virtual camera to the position of the destination, intersects with the shielding object from an outside of the shielding object in the virtual space and (b) a second vector heading from the position of the destination to the position of the object to be captured by the virtual camera, does not intersect with the shielding object from the outside of the shielding object in the virtual space; and
   generate an image of the virtual space based on the moved virtual camera.

2. The information processing system according to claim 1, wherein the virtual camera is moved to the position of the destination in a case where the first vector does not intersect with the shielding object from the outside of the shielding object.

3. The information processing system according to claim 1, wherein the virtual camera is moved to the position of the destination in a case where the first vector intersects with the shielding object from the outside of the shielding object and the second vector intersects with the shielding object from the outside of the shielding object.

4. The information processing system according to claim 1, wherein the avoidance position is at a position on a side of the object to be captured from the shielding object.

5. The information processing system according to claim 1, wherein the position of the destination is calculated based on the predetermined information processing according to an operation of a player.

6. The information processing system according to claim 5, wherein the information processing is performed to move the virtual camera together with movement of the object to be captured, that moves in the virtual space based on the operation of the player, and the position of the destination is calculated.

7. The information processing system according to claim 5, wherein the information processing is performed to move the virtual camera in accordance with an instruction of the player for moving the virtual camera, and the position of the destination is calculated.

8. The information processing system according to claim 1, wherein the image indicating the position of the object to be captured in the virtual space is generated, the object to be captured being shielded by the shielding object.

9. The information processing system according to claim 8, wherein the image indicating the object to be captured is generated with a silhouette, the object to be captured being shielded by the shielding object.

10. The information processing system according to claim 1, wherein execution of the computer readable instructions further causes the information processing system to:
    perform a first determination of whether the first vector intersects with the shielding object from the outside of the shielding object;
    perform a second determination of whether the second vector intersects with the shielding object from the outside of the shielding object; and
    move the virtual camera based on a result of the first determination and a result of the second determination.

11. The information processing system according to claim 10, wherein the second determination is performed in a case where the result of the first determination indicates that the first vector intersects with the shielding object from the outside of the shielding object.

12. A game system comprising:
    a processor; and
    a memory configured to store computer readable instructions that, when executed by the processor, cause the game system to:
    move a player character object in a virtual space based on an operation of a player;
    calculate a position of a destination of a virtual camera in the virtual space, in accordance with the movement of the player character object;
    determine whether a shielding object is present between the position of the destination and the player character object;
    determine whether the position of the destination is inside the shielding object;
    move the virtual camera to a position on a side of the player character object from the shielding object when the shielding object is present between the position of the destination and the player character object and the position of the destination is inside the shielding object; and
    generate an image of the virtual space to display the image indicating, on the shielding object, that the player character object is present, the player character object being shielded by the shielding object, when the shielding object is present between the position of the destination and the player character object and the position of the destination is outside the shielding object.

13. A non-transitory storage medium having stored therein an information processing program for causing an information processing device to provide execution comprising:
    calculating a position of a destination of a virtual camera in a virtual space, based on predetermined information processing;
    moving the virtual camera to an avoidance position at which a shielding object is avoided, in a case where (a) a first vector heading from a position of an object to be captured by the virtual camera to the position of the destination, intersects with the shielding object from an outside of the shielding object in the virtual space and (b) a second vector heading from the position of the destination to the position of the object to be captured by the virtual camera, does not intersect with the shielding object from the outside of the shielding object in the virtual space; and generating an image of the virtual space, based on the moved virtual camera.

14. The non-transitory storage medium according to claim 13, wherein the virtual camera is moved to the position of the destination in a case where the first vector does not intersect with the shielding object from the outside of the shielding object.

15. The non-transitory storage medium according to claim 13, wherein the virtual camera is moved to the position of the destination in a case where the first vector intersects with the shielding object from the outside of the shielding object and the second vector intersects with the shielding object from the outside of the shielding object.

16. The non-transitory storage medium according to claim 13, wherein the avoidance position is at a position on a side of the object to be captured from the shielding object.

17. The non-transitory storage medium according to claim 13, wherein the position of the destination is calculated based on the predetermined information processing according to an operation of a player.

18. The non-transitory storage medium according to claim 17, wherein the information processing is performed to move the virtual camera together with movement of a player character object, that moves in the virtual space based on the operation of the player, and the position of the destination is calculated.

19. The non-transitory storage medium according to claim 17, wherein the information processing is performed to move the virtual camera in accordance with an instruction of the player for moving the virtual camera, and the position of the destination is calculated.

20. The non-transitory storage medium according to claim 13, wherein the image indicating the position of the object to be captured in the virtual space is generated, the object to be captured being shielded by the shielding object.

21. The non-transitory storage medium according to claim 20, wherein the image indicating the object to be captured is generated with a silhouette, the object to be captured being shielded by the shielding object.

22. The non-transitory storage medium according to claim 13 causing the information processing device to provide further execution comprising:
performing a first determination of whether the first vector intersects with the shielding object from the outside of the shielding object;
performing a second determination of whether the second vector intersects with the shielding object from the outside of the shielding object; and
moving the virtual camera based on a result of the first determination and a result of the second determination.

23. The non-transitory storage medium according to claim 22, wherein the second determination is performed in a case where the result of the first determination indicates that the first vector intersects with the shielding object from the outside of the shielding object.

24. A non-transitory storage medium having stored therein a game program for causing an information processing device to provide execution comprising:
moving a player character object in a virtual space based on an operation of a player;
calculating a position of a destination of a virtual camera in the virtual space, in accordance with the movement of the player character object;
determining whether a shielding object is present between the position of the destination and the player character object;
determining whether the position of the destination is inside the shielding object;
moving the virtual camera to a position on a side of the player character object from the shielding object when the shielding object is present between the position of the destination and the player character object and the position of the destination is inside the shielding object; and
generating an image of the virtual space to display the image indicating, on the shielding object, that the player character object is present, the player character object being shielded by the shielding object, when the shielding object is present between the position of the destination and the player character object and the position of the destination is outside the shielding object.

25. An information processing device comprising:
a display device; and
processing circuitry including at least one processor, the processing circuitry configured to:
calculate a position of a destination of a virtual camera in a virtual space, based on predetermined information processing;
move the virtual camera to an avoidance position at which a shielding object is avoided, in a case where (a) a first vector heading from a position of an object to be captured by the virtual camera to the position of the destination, intersects with the shielding object from an outside of the shielding object in the virtual space and (b) a second vector heading from the position of the destination to the position of the object to be captured by the virtual camera, does not intersect with the shielding object from the outside of the shielding object in the virtual space; and
generate an image of the virtual space for display on the display device based on the moved virtual camera.

26. A game device comprising:
a display device; and
processing circuitry including at least one processor, the processing circuitry configured to:
move a player character object in a virtual space based on an operation of a player;
calculate a position of a destination of a virtual camera in the virtual space in accordance with the movement of the player character object;
determine whether a shielding object is present between the position of the destination and the player character object;
determine whether the position of the destination is inside the shielding object;
move the virtual camera to a position on a side of the player character object from the shielding object when the shielding object is present between the position of the destination and the player character object and the position of the destination is inside the shielding object; and
generate an image of the virtual space to display the image, on the display device, indicating, on the shielding object, that the player character object is present, the player character object being shielded by the shielding object, when the shielding object is present between the position of the destination and the player character object and the position of the destination is outside the shielding object.

27. An information processing method comprising:
calculating a position of a destination of a virtual camera in a virtual space, based on predetermined information processing;
moving the virtual camera to an avoidance position at which a shielding object is avoided, in a case where (a) a first vector heading from a position of an object to be captured by the virtual camera to the position of the destination, intersects with the shielding object from an outside of the shielding object in the virtual space and (b) a second vector heading from the position of the destination to the position of the object to be captured by the virtual camera, does not intersect with the shielding object from the outside of the shielding object in the virtual space; and
generating an image of the virtual space, based on the moved virtual camera.

28. A game method comprising:
moving a player character object in a virtual space, based on an operation of a player;
calculating a position of a destination of a virtual camera in the virtual space, in accordance with the movement of the player character object;
determining whether a shielding object is present between the position of the destination and the player character object;
determining whether the position of the destination is inside the shielding object;
moving the virtual camera to a position on a side of the player character object from the shielding object when the shielding object is present between the position of the destination and the player character object and the position of the destination is inside the shielding object; and
generating an image of the virtual space to display the image indicating, on the shielding object, that the player character object is present, the player character object being shielded by the shielding object, when the shielding object is present between the position of the destination and the player character object and the position of the destination is outside the shielding object.

* * * * *